L. W. HARE.
TRANSMISSION GEARING.
APPLICATION FILED AUG. 25, 1917.

1,290,184.

Patented Jan. 7, 1919.
2 SHEETS—SHEET 1.

Witness
H. N. Lybrand
R. M. Smith

Inventor
L. W. Hare
By Victor J. Evans
Attorney

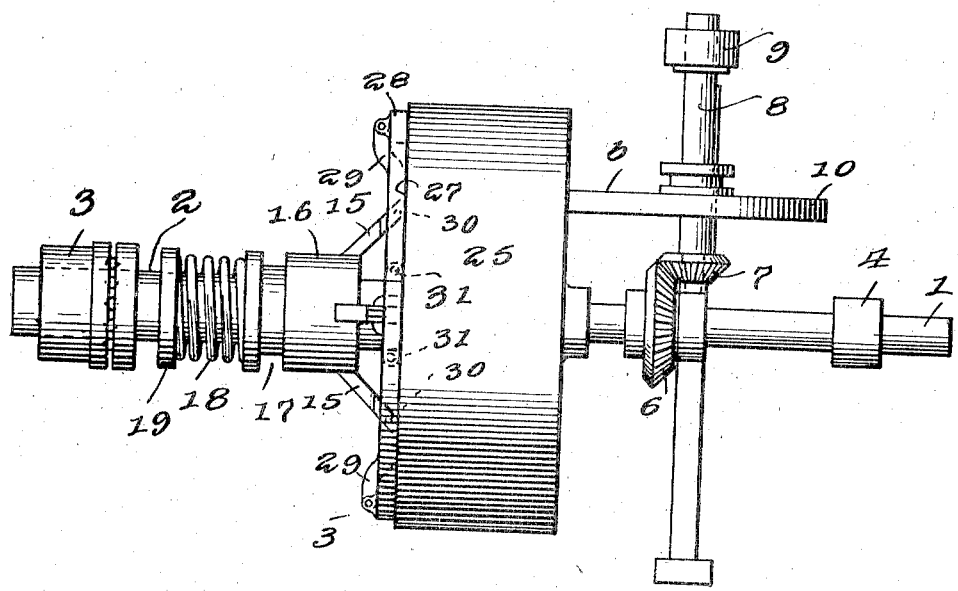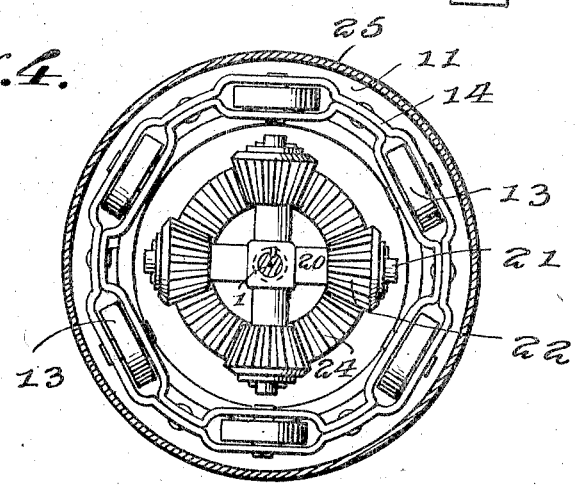

UNITED STATES PATENT OFFICE.

LEE WILBER HARE, OF ANOKA, MINNESOTA.

TRANSMISSION-GEARING.

1,290,184.     Specification of Letters Patent.     Patented Jan. 7, 1919.

Application filed August 25, 1917. Serial No. 188,259.

*To all whom it may concern:*

Be it known that I, LEE WILBER HARE, a citizen of the United States, residing at Anoka, in the county of Anoka and State of Minnesota, have invented new and useful Improvements in Transmission-Gearings, of which the following is a specification.

This invention relates to transmission gearing, the object in view being to provide reliable and efficient variable speed transmission gearing, whereby any desired speed up to direct drive may be obtained between a driving shaft and a driven shaft and whereby also the direction of rotation of the driving shaft may be reversed without any additional instrumentalities.

While the transmission gearing hereinafter particularly described is especially designed for use in conjunction with the driving mechanism of motor vehicles, it will be apparent as the description proceeds, that the improved transmission gearing is capable of various uses which will readily suggest themselves to the manufacturer.

With the above and other objects in view, the invention consists in the novel construction, combination and arrangement of parts, herein described, illustrated and claimed.

In the accompanying drawings:—

Fig. 3 is a top plan view of the transmission gearing.

Fig. 4 is a section on the line 4—4 of Fig. 1.

Figure 1:
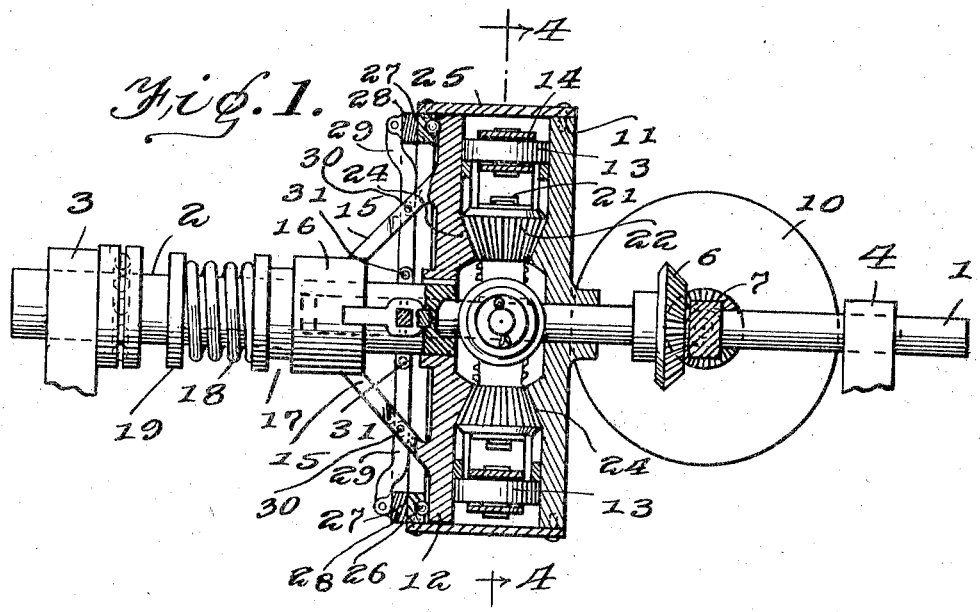
Figure 1 is a view partly in elevation and partly in section of the improved transmission gearing.

Referring to the drawings 1 designates the driving shaft of the transmission gearing and 2 the driven shaft, said driving and driven shafts having their longitudinal axes in line with each other and mounted in bearings 3 and 4 on a suitable supporting frame 5.

The driving shaft 1 has fast thereon a bevel gear 6 which meshes with a smaller bevel gear 7 on a countershaft 8 journaled in bearings 9 on the frame 5 and having thereon a friction wheel 10 which is capable of a sliding movement longitudinally of the shaft 8 but keyed or otherwise connected with the shaft 8 so that the shaft 8 and the wheel 10 always rotate together.

Coöperating with the periphery of the friction wheel 10 is a friction disk 11 loose on the shaft 1. Arranged behind the disk 11 and in spaced relation thereto is another disk 12. Between the disks 11 and 12 is a circular series of wheels or rollers 13 journaled in a circular frame 14 which serves to hold the rollers in spaced relation to each other. It is preferred to use four or more of the rollers 13 so as to support the disk 11 while coöperating with the friction wheel 10. Extending back from the disk 12 is a plurality of braces or arms 15 which are fixedly connected to a sliding collar or hub 16 having a groove 17 to receive a shifting fork (not shown). Arranged behind the collar 16 is a compression spring 18 one end of which bears against the collar 16 while the other end bears against a fixed collar 19 on the driven shaft 2, the last named shaft being of tubular formation and being rotatable upon and in relation to the driving shaft 1. The collar 16 is feathered on the tubular driven shaft 2 but is capable of a limited amount of longitudinal or sliding movement thereon, the purpose of which will appear.

20 designates a spider which is feathered to but slidable for a limited distance on the shaft 1, said spider comprising a plurality of journals 21 upon which are mounted a corresponding number of planetary pinions 22. Three or more of such pinions may be employed and they coöperate with annular gear faces 23 and 24 on the inner adjacent faces of the disks 11 and 12. A cylindrical housing or casing 25 extends around the peripheries of the disks 11 and 12 and is securely fastened to the former. The casing or housing 25 extends in rear of the disk 11 and has secured to the inner face thereof an end thrust ball bearing 26 having a friction clutch face 27 with which coöperates a clutch ring or band 28. A circular series of clutch levers 29 coöperate with the clutch band 28 to move the same into and out of engagement with the clutch face 27. Each of the levers 29 is connected by a pivot 30 to one of the braces 15 and is further connected by a pivot 31 to a lug on the driven shaft 2. The arrangement just referred to is such that when the collar 16 is shifted slightly in one direction, the clutch faces 27 and 28 will be thrown into engagement with each other and when the collar 16 is moved in the opposite direction, said clutch faces will be thrown out of contact.

Figure 2:
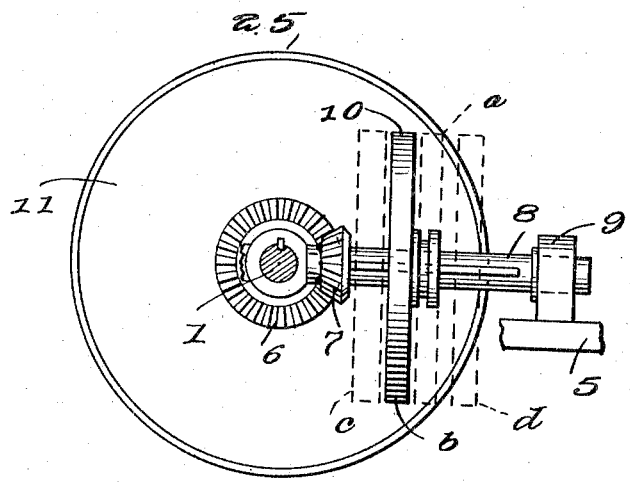
Fig. 2 is a view taken at right angles to Fig. 1, looking toward the face of the driven disk.

The operation of the transmission gearing may be described as follows. Motion being imparted to the driven shaft 1 by means of an engine or other suitable motor, rotary motion is imparted to the friction wheel 10 by means of the gears 6 and 7. At the same time rotary motion is imparted to the spider 20 causing the pinions 22 to move in a circular path while engaging the ring gears or gear faces 23 and 24. When the friction wheel 10 is in the position $a$ of Fig. 2, by reason of the distance between the wheel 10 and the center of the shaft 1, the disk 11 will be driven somewhat faster than the wheel 10. While the friction disk 11 is being rotated at this speed, the spider 20 is traveling at the same speed as the shaft 1 and consequently the pinions 22 are being driven by the gear face 24 and are driving the gear face 23, and therefore the disk 12, motion being communicated by the disk 12, the braces 15 and the collar 16 to the driven shaft 2. The position of the parts just described places the gearing in what is known as low speed forward. When the wheel 10 is moved to the position $b$, the mechanism is in what is known as neutral, as the speed of the wheel 11 is then increased to such a point that it is traveling sufficiently faster than the spider 20 to cause the pinions 22 to roll upon or around the gear face 23 without imparting motion to the disk 12 and the collar 16. Therefore the driven shaft 2 remains at rest. When the wheel 10 is moved to the position $c$, the speed of the disk 11 is so great that the pinions 22 are caused to actuate the disk 12 and the collar 16 in the opposite direction producing what is known as reverse gear. High speed is obtained by shifting the wheel 10 to the position $d$ where it engages the face of the disk 11 immediately adjacent to the periphery thereof as indicated in Fig. 2. At this point the disk 11 is driven at a speed which will cause the driven shaft 2 to rotate at the same speed as the driving shaft 1 and when the parts are in this position, the operator by shifting the collar 16 so as to operate the clutch levers 29 which brings the clutch band or ring 28 into working engagement with the clutch face 27 thereby causing the gears 22 and the disks 11 and 12 together with the collar 16 to rotate as one. This also has the effect of shifting the disk 11 out of frictional engagement with the wheel 10 so that all of the working parts of the gearing may be said to be out of mesh, the mechanism as a whole being at that time in which is usually termed in the motor vehicle art as direct drive. Therefore the greater portion of the mechanism hereinabove described is not utilized except when the operator is shifting gears to get into what is known as high speed or direct drive. It will also be observed that I do not have to employ any extra parts such as gears in order to obtain what is known as reverse gear.

I claim:—

1. In transmission gearing, the combination of a driving shaft, a driven shaft in line therewith, a countershaft extending at a right angle to the driving shaft and positively geared thereto and actuated thereby, a friction wheel on said countershaft, a friction disk on the driving shaft coöperating with the periphery of said friction wheel and having an annular gear face, the friction wheel being shiftable across the face of the friction disk, a second disk arranged behind said friction disk and in spaced relation thereto and also having an annular gear face, said second disk having a feathered engagement with the driven shaft, a spider arranged between said disks and having a feathered engagement with said driving shaft, and planetary pinions journaled on said spider and meshing with the annular gear faces on said disks.

2. In transmission gearing, the combination of a driving shaft, a driven shaft in line therewith, a countershaft extending at a right angle to the driving shaft and positively geared thereto and actuated thereby, a friction wheel on said countershaft, a friction disk on the driving shaft coöperating with the periphery of said friction wheel and having an annular gear face, the friction wheel being shiftable across the face of the friction disk, a second disk arranged behind said friction disk and in spaced relation thereto and also having an annular gear face, said second disk having a feathered engagement with the driven shaft, a spider arranged between said disks and having a feathered engagement with said driving shaft, planetary pinions journaled on said spider and meshing with the annular gear faces on said disks, and clutching means for causing said friction disk to rotate at the same speed with said second disk.

3. In transmission gearing, the combination of a driving shaft, a driven shaft in line therewith, a countershaft extending at a right angle to the driving shaft and positively geared thereto and actuated thereby, a friction wheel on said countershaft, a friction disk on the driving shaft coöperating with the periphery of said friction wheel and having an annular gear face, the friction wheel being shiftable across the face of the friction disk, a second disk arranged behind said friction disk and in spaced relation thereto and also having an annular gear face, said second disk having a feathered engagement with the driven shaft, a spider arranged between said disks and having a feathered engagement with said driving shaft, planetary pinions journaled on said spider and meshing with the annular gear faces on said disks, and rollers arranged between said disks and in working contact therewith.

4. In transmission gearing, the combination of a driving shaft, a driven shaft in line therewith, a countershaft extending at a right angle to the driving shaft and positively geared thereto and actuated thereby, a friction wheel on said countershaft, a friction disk on the driving shaft coöperating with the periphery of said friction wheel and having an annular gear face, the friction wheel being shiftable across the face of the friction disk, a second disk arranged behind said friction disk and in spaced relation thereto and also having an annular gear face, said second disk having a feathered engagement with the driven shaft, a spider arranged between said disks and having a feathered engagement with said driving shaft, planetary pinions journaled on said spider and meshing with the annular gear faces on said disks, a cylindrical housing fastened to the first mentioned friction disk and extending from and beyond said second disk and having a clutch face, a clutch band movable into and out of engagement with said clutch face, and means controlled by said second disk for shifting said clutch band as said second clutch disk is moved longitudinally of the driving shaft.

5. In transmission gearing, the combination of a driving shaft, a driven shaft in line therewith, a countershaft extending at a right angle to the driving shaft and positively geared thereto and actuated thereby, a friction wheel on said countershaft, a friction disk on the driving shaft coöperating with the periphery of said friction wheel and having an annular gear face, the friction wheel being shiftable across the face of the friction disk, a second disk arranged behind said friction disk and in spaced relation thereto and also having an annular gear face, said second disk having a feathered engagement with the driven shaft, a spider arranged between said disks and having a feathered engagement with said driving shaft, planetary pinions journaled on said spider and meshing with the annular gear faces on said disks, a cylindrical housing fastened to the first mentioned friction disk and extending from and beyond said second disk and having a clutch face, a clutch band movable into and out of engagement with said clutch face, means controlled by said second disk for shifting said clutch band as said second clutch disk is moved longitudinally of the driving shaft, and an end thrust bearing mounted within and carried by said housing and coöperating with said second disk.

6. In transmission gearing, the combination of a driving shaft, a driven shaft in line therewith, a countershaft extending at a right angle to the driving shaft and positively geared thereto and actuated thereby, a friction wheel on said countershaft, a friction disk on the driving shaft coöperating with the periphery of said friction wheel and having an annular gear face, the friction wheel being shiftable across the face of the friction disk, a second disk arranged behind said friction disk and in spaced relation thereto and also having an annular gear face, said second disk having a feathered engagement with the driven shaft, a spider arranged between said disks and having a feathered engagement with said driving shaft, planetary pinions journaled on said spider and meshing with the annular gear faces on said disks, and a compression spring operating to press said second disk toward the first named friction disk.

In testimony whereof I affix my signature.

LEE WILBER HARE.

Copies of this patent may be obtained for five cents each, by addressing the "Commissioner of Patents, Washington, D. C."